(12) United States Patent
D'Amario

(10) Patent No.: US 7,582,842 B2
(45) Date of Patent: Sep. 1, 2009

(54) METHOD AND APPARATUS FOR GENERATING MACHINING PULSES FOR ELECTRICAL DISCHARGE MACHINING

(75) Inventor: Rino D'Amario, Sigirino (CH)

(73) Assignee: Agie SA, Losone (CH)

( * ) Notice: Subject to any disclaimer, the term of this patent is extended or adjusted under 35 U.S.C. 154(b) by 563 days.

(21) Appl. No.: 11/392,910

(22) Filed: Mar. 29, 2006

(65) Prior Publication Data

US 2006/0249483 A1   Nov. 9, 2006

(30) Foreign Application Priority Data

May 6, 2005   (EP) .................................. 05009915

(51) Int. Cl.
   *B23H 1/02*   (2006.01)
   *B23H 7/14*   (2006.01)
(52) U.S. Cl. ................................. 219/69.13; 219/69.18
(58) Field of Classification Search ............. 219/69.13, 219/69.18; 315/363
See application file for complete search history.

(56) References Cited

U.S. PATENT DOCUMENTS

| 4,205,212 A |   | 5/1980 | Ullmann et al. ........... 219/69 W |
| 4,650,776 A | * | 3/1987 | Cerceau et al. ........... 219/69.17 |
| 4,766,281 A |   | 8/1988 | Bühler ...................... 219/69 P |
| 5,378,866 A | * | 1/1995 | Taneda .................... 219/69.18 |
| 5,572,003 A | * | 11/1996 | Kaneko .................... 219/69.13 |
| 6,566,823 B2 |   | 5/2003 | Kinbara et al. ............. 315/246 |
| 2003/0006721 A1 | * | 1/2003 | Kinbara et al. ............. 315/363 |

FOREIGN PATENT DOCUMENTS

| DE | 26 53 857 C2 | 2/1978 |
| EP | 268 109 B1 | 5/1988 |
| EP | 313 049 B1 | 4/1989 |
| EP | 659 514 A1 | 6/1995 |
| GB | 589127 | 10/1942 |
| JP | 4-331020 A | * 11/1992 |
| JP | 7-266133 | 10/1995 |

OTHER PUBLICATIONS

"Impulse in der Grenzphysik", Bartl et al., Oldenbourg Verlag, Munich 1976, pp. 131-140.
"Optical Emission Spectroscopy of Electrical Discharge Machining Plasma", Descoeudres et al., Journal of Physics D: Applied Physics, 37, 2004, pp. 875-882.

* cited by examiner

*Primary Examiner*—Geoffrey S Evans
(74) *Attorney, Agent, or Firm*—Marshall, Gerstein & Borun LLP

(57) ABSTRACT

An apparatus and a method of generating machining pulses for electrical discharge machining by discharge of at least one line applying a voltage to a working gap formed between a machining electrode and a workpiece, including the steps of: charging the line via a first charging circuit by a voltage source, discharging the line after ignition of the spark gap directly via a diode, without impedance matching, at the working gap, and recharging the line after a predefined pulse-off time.

31 Claims, 4 Drawing Sheets ical discharge machining (EDM), and more specifically to a method and an apparatus for generating machining pulses for electrical discharge machining, such as wire-cutting and die-sinking EDM, in the range of medium-machining accuracy or roughness between rough-machining and fine-machining.

METHOD AND APPARATUS FOR GENERATING MACHINING PULSES FOR ELECTRICAL DISCHARGE MACHINING

BACKGROUND OF THE INVENTION

1. Field of the Invention

The invention relates generally to electrical discharge machining (EDM), and more specifically to a method and an apparatus for generating machining pulses for electrical discharge machining, such as wire-cutting and die-sinking EDM, in the range of medium-machining accuracy or roughness between rough-machining and fine-machining.

2. Related Technology

The range of medium-machining accuracy, i.e. with a surface roughness Ra in the range of 0.15 μm to 0.8 μm has, in the past, been neglected by manufacturers of EDM machines in favor of maximizing erosion performance and finest surfaces. This is not justified, for one thing already, because the times of all steps in machining add up, and, for another, because poor machining quality effects subsequent machining steps over-proportionally. Since the rough-machining of the workpiece generates only a very inaccurate surface, whereas the fine-machining can be implemented only with the small erosion rates, it would be totally uneconomical to directly change from rough-machining to fine-machining.

In the pulse generator known from JP 07-266 133A (OIZUMI), as shown in FIG. 2, coaxial cables A, B are connected via terminal resistors ZA, ZB having matching impedances between an electrode E and a workpiece W. The coaxial cables A, B are charged by a voltage source U via a transistor T, a load resistor R and the terminal resistors ZA, ZE. A frequency generator G generates at the transistor T the desired pulse-on/off times for the charging process. When sparking between the electrode E and the workpiece W occurs, the coaxial cables A, B are discharged over the terminal resistors ZA, ZB in a theoretically square pulse whose duration is determined by the length of the coaxial cables and whose amplitude is a function of the voltage U of the voltage source and the line impedance of the coaxial cables. This known configuration has, however, the following drawbacks, for instance: The charge circuit has firstly the disadvantage that it only works when the terminal resistors ZA, ZB precisely correspond to the line impedance of the coaxial cables A, B. Since the discharge circuit formed by the electrode E and workpiece W also comprise a stray inductance as well as a stray capacitance, however, unavoidable reflections occur, resulting in sinusoidal, bipolar pulses and in corresponding high electrode wear. A second drawback exists in the way the no-load voltage is generated. When the spark or working gap is too large, then no more discharges should occur so as not to detriment the workpiece geometry by sparkout. However, it is just this sparkout that occurs with this arrangement, because the charged coaxial cables A, B, despite the interrupted transistor T, apply a DC voltage to the working gap. A further problem is involved in the arrangement of the terminal resistors ZA, ZB themselves, via which charging and discharging the coaxial cables occurs, which firstly have a very modest efficiency of between 50% and 2.3% depending on the pulse amplitude and cable impedance, and secondly resulting in merely half the pulse amplitude at the spark gap. A further drawback is the high power loss of the terminal resistors ZA, ZB of e.g. 100 kW pulse power at a current amplitude of 100 A and a cable impedance of 10Ω occurring directly in the working zone, possibly resulting in thermally induced deformation of the machine structure and thus in additional errors. Also unpractical is accommodating the quite considerable length of the coaxial cables for longer pulses on the machine. This is why the generator known from JP 07-266 133A is unsuitable for medium accuracy machining.

A similar discharge pulse generator for generating machining pulses for electrical discharge machining is disclosed in U.S. Pat. No. 6,566,823 (Kinbara). Also here the generator circuit comprises a resistor having a resistance value equal to the characteristic impedance of the energy discharging coaxial lines in order to provide an impedance matching. Thus, the drawbacks mentioned above apply for this generator as well.

So-called line or cable generators using the principle of generating ultrashort high-energy pulses by the discharge of delay lines are known since more than 60 years. A detailed explanation of the principle of line generators, by way of examples for high-energy generators, is disclosed in the textbook "Impulse in der Grenzphysik", W. Bartel, et al., Oldenbourg Verlag, Munich 1976, pages 132 to 134. In the same book, pages 135 to 137, the principle of the Blumlein line generator (see also GB 589 127, filed on Oct. 10, 1941) is also described. This generator comprises two lines which when loaded are definitely mismatched to twice the line impedance. Because of the mismatch and the resulting reflections two part-pulses add up into a total pulse having a duration corresponding to twice the delay time but with the full amplitude. The Blumlein generator would thus eliminate the main drawback of JP 07-266 133A which can only attain half the amplitude. Unfortunately the stray inductance and stray capacitance of the discharge circuit disturb functioning of the Blumlein generator to such a considerable extent that it is of no interest for the present application.

For the sake of completeness, mention is also made of EP 0 313 049 B1 (Marsicovetere et al) disclosing a technique to decouple the coaxial cables by switches or diodes from the spark gap in EDM fine-machining. This document makes, however, no contribution to medium accuracy machining.

Thus, there is an need to provide a method and an apparatus for generating machining pulses for electrical discharge machining (EDM) which are better suitable for machining in the medium-machining range, i.e. between rough-machining and fine-machining.

SUMMARY OF THE INVENTION

A first aspect of the invention is directed to a method of generating machining pulses for electrical discharge machining by discharge of at least one line applying a voltage to a working gap formed between a machining electrode and a workpiece, comprising the steps of charging the line via a first charging circuit by a voltage source, discharging the line after ignition of the spark gap directly via a diode, without impedance matching, at the working gap, and recharging the line after a predefined pulse-off time.

Another aspect of the invention is directed to an apparatus for generating machining pulses for electrical discharge machining by discharge of at least one line applying a voltage to a working gap formed between a machining electrode and a workpiece wherein a first charging circuit connected to a voltage source is provided for charging the line from an generator end, and that the line is discharged after ignition of the spark gap directly via a diode, without impedance matching, at the working gap, and the line recharged after a predefined pulse-off time.

Still another aspect of the invention is directed to the use of an apparatus for generating machining pulses for electrical discharge machining by discharge of at least one line, for generating machining pulses having a leading edge reaching the amplitude of about 6-100 A no later than about 100 ns after ignition of the spark gap.

Yet another aspect of the invention is directed to the use of an apparatus for generating machining pulses for electrical discharge machining by discharge of at least one line, for EDM machining polycrystalline diamond (PCD), cubic boron nitride (CBN), hard metal, carbide or high-melting materials.

Other features are inherent in the methods and products disclosed or will become apparent to those skilled in the art from the following detailed description of embodiments and the accompanying drawings.

BRIEF DESCRIPTION OF THE DRAWINGS

Embodiments of the invention will now be described, by way of example, and with reference to the accompanying drawings, in which.

DESCRIPTION OF THE PREFERRED EMBODIMENTS

Figure 1:
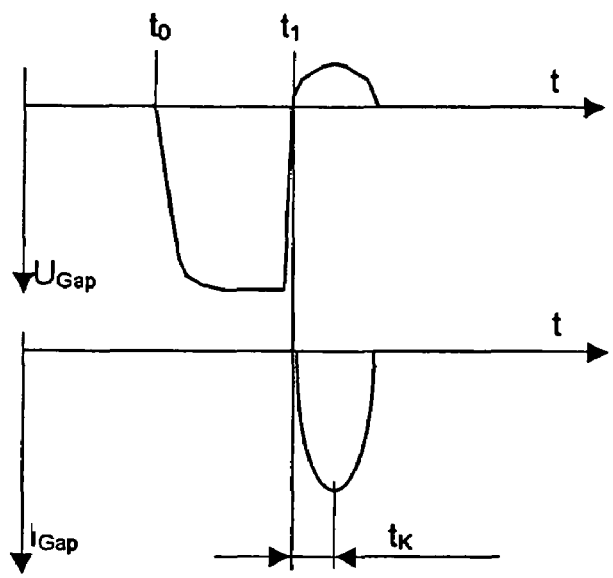
FIG. 1 is a schematic illustration of pulse shapes on a spark gap by an embodiment in accordance with the invention.
Figure 2:
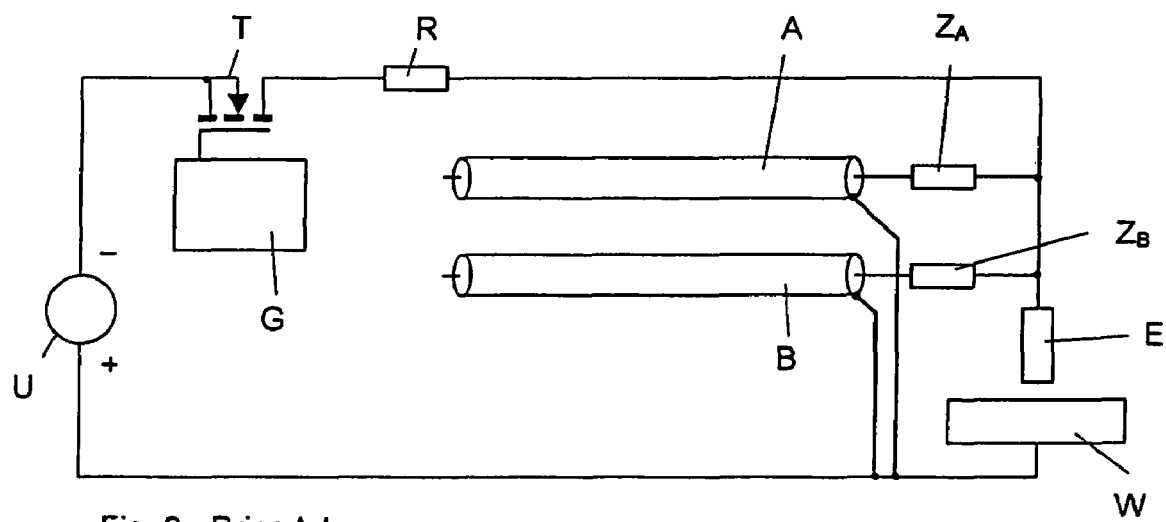
FIG. 2 is a schematic illustration of a known pulse generator (Oizumi) using delay lines.

Before proceeding further with the detailed description of FIGS. 1-8, however, a few items of the preferred embodiments will be described.

According to an embodiment, the achievement in accordance with the invention is based on the principle of line generators but avoiding their disadvantages by eliminating, for example, the terminal resistors at the load end used in the prior art generators. In their place one or more power diodes may be used to obtain a monopolar pulse shape which firstly increases the efficiency and secondly transmits the full pulse amplitude to the working gap. In this embodiment, parasitic stray inductance and stray capacitance of the machining zone as well as already existing power diodes and power cables are intentionally incorporated in the concept of pulse generation, resulting in interesting synergistic effects. The connection lines are charged without overshoot and if should no discharge occur across the spark gap discharged after a defined time. The parasitic elements are pumped by the lines on discharge, i.e. caused to resonate by the high-energy short pulses, resulting in an increase in the current pulse which is free of delay and very fast. This is an important requirement for attaining the required high spark temperature.

According to an embodiment, as the line(s) of discharge use is made of already existing one or more coaxial lines of an electrical discharge machine which are designed for a rough-machining stage.

According to another embodiment, as an alternative independent aspect, to the pulse generator as described above, only an already existing fine-machining cable, i.e., a coaxial line designed for a fine-machining stage of the electrical discharge machine, and a bipolar fine-machining generator is made use of for generating even shorter pulses. Naturally in this case no fast power diode may be used in the discharge circuit. This results in the pulse also being bipolar but with a strongly pronounced first halfwave. This aspect can be put to use to advantage as the last machining stage before fine-machining where electrode wear is uncritical.

As compared to prior art, the embodiments have the advantages of sophisticating the generation of machining pulses for electrical discharge machining such that electrical discharge machining in the medium-machining range between rough-machining and fine-machining may now be implemented significantly faster, more accurately and kinder for the materials with no detriment whatsoever to rough-machining and fine-machining whilst maximizing the spark temperature to permit machining even exotic, for example, highly brittle and high melting materials with good results.

The methods and pulse generation apparatus, according to preferred embodiments, are preferably suitable for machining hard brittle and high melting materials on wire EDM machines in the medium-machining range, preferably, for instance with a surface roughness Ra=0.15 to 0.8 μm, i.e. between rough-machining and fine-machining, with the addition of such special cases as machining with very thin wire electrodes, highly filigree workpiece contours or exotic materials such as polycrystalline diamond (PCD) where the method in accordance with the invention can even be used for the main cut to great advantage. However, the embodiments may also be put to use practically with no change for machining in EDM die-sinking machines, particularly drilling, milling or micro die-sinking EDM, since the requirements as applicable to these type systems for maximized spark temperatures are no different to those of wire-cutting EDM.

According to the embodiments, the preferred field of application is the generation of non-delayed EDM pulses of much shorter duration and higher amplitude than as permitted hitherto by known generator techniques. It is for these pulses that the spark temperature is now drastically increased resulting in the materials being vapor eroded with hardly any heating of the parent material, i.e. with basically no structural change and without thermal stress of the material.

Returning now to FIG. 1, there is illustrated a typical pulse shape for voltage and current of a method and a pulse generation apparatus for electrical discharge machining in accordance with an embodiment of the invention. The upper curve shows the voltage profile Ugap across the spark gap in a working gap formed between a machining electrode and a workpiece, as a function of the time t. At a time to a negative pulse voltage of e.g. −250V is transmitted, without overshoot, to the machining electrode, such as a wire electrode of a wire-cutting EDM machine. After about 1 μs, at $t_1$ the discharge in the working gap occurs and the voltage Ugap collapses within just a few ns. Should no spark ignition of the erosion process occur, this would be detected by detection means after a time of e.g. 3 μs, resulting in the working gap being discharged by a discharge unit with no undershoot and the voltage Ugap would be maintained for a pulse-off or pause time of e.g. 4 μs at 0V. After this, the next voltage pulse is applied to the working gap. After a normal discharge the pulse-off time is immediately activated; if a short-circuit occurs at the working gap, the pulse-on time can immediately be discontinued.

The lower curve shows the current profile Igap in the working gap as a function of time t. This current profile is preferably required to satisfy special criteria. The time $t_k$ between occurrence of discharge ($t_1$) and the maximum in the current pulse is preferably of the order of 100 ns and below. The rate at which the leading edge of the current increases is preferably in the order of approximately 1 A/ns at the start and is preferably required to start immediately on collapse of the voltage. The amplitude of the pulse current is in the range between 6 A and 100 A depending on the setting of the charging voltage and selected number of discharge lines or cables. The duration of a current pulse is in the range of 100 ns to 250 ns, depending on the number of discharge lines used. In this embodiment, the machining pulses with a an effective spark voltage of about 25V provide a pulse power of about 100 W to 2 kW in about 100 ns after ignition of the spark gap. The pulse energy amounts to about 10-200 µJ in about 100 ns after ignition. The average pulse power applied to the working gap is, however, relatively low: 2-40 W (at 200 kHz average spark frequency), 5-100 W (500 kHz) and 10-200 W (1 MHz).

The reason for the extreme requirements, in the above embodiment, is that the desired high plasma temperatures of the spark may be attained roughly during the first 100 ns, because it is then that the spatial expansion of the plasma is still very slight.

For various reasons, particularly for lack of measuring instruments, there are currently hardly any useful measurements and calculations available in basic research for plasma temperatures in the range 0 to 100 ns following the spark discharge in an erosion process. Speculation estimates put the figure to more than 100,000K as based on models with spheres, hemispheres or cylinders of plasma which expand maximally at the speed of sound of the dielectric of the order of approximately 1.5 µm/ns, resulting in the plasma being cooled down to below 10,000K already after approximately 100 ns. With the aforementioned pulses the maximum specific power at plasma surface would be in the order of 100 kW/mm2.

Some of the problems involved in these theoretical calculations are estimating the thermodynamic parameters, namely volume, pressure and temperature as well as the efficiency of the energy introduced into the plasma, some of which is already lost in the machining electrode and the workpiece due to $I^2R$ losses, aggravated by other losses to an unknown degree due to diffusion from the plasma volume and because of plasma specific events in the atomic range. Although the Boyle-Mariotte law would state the link in the thermodynamic parameters, their effective values—with the exception of the energy introduced—are unknown, however. Apart from this applying the Boyle-Mariotte law to this extreme range is still controversial.

At the Research Institute for Plasma Physics of EPFL, Lausanne, Switzerland, Descoeudres et al. (see "Optical Emission Spectroscopy of EDM Plasma", Journal of Physics D: Applied Physics 37 (2004), pages 875-882) recently conducted spectral measurements of the light emitted by EDM sparks with a pulse duration in the range 1.6 µs to 100 µs in concluding therefrom the temperatures which were of the order of 8,100K and thus in partly confirming the values as speculated above.

The improvements achievable in practice by way of the embodiments of the invention are, of course, of salient interest to the user. To date, what has been found out is e.g. the enormous improvements both qualitatively and quantatively in polycrystalline diamond (PCD) machining by no longer hardly any washouts at all occurring in the interlayer between diamond layer and base material. Moreover, the surface quality, e.g., for wire-cutting EDM is already better in a main cut stage than with conventional methods involving a main cut and two after-cuts. Some of the embodiments of the invention are especially beneficial in machining hardmetal or carbide where silvery workpieces can now be used instead of the earlier dull, black and impure surfaces with a more than 30% time saving directly as of the machine.

Prior art generators are not capable of achieving the necessary pulse properties since they comprise supply lines and cables with corresponding delay effects, the only exception being the fine-machining generators for generating low current for fine-machining the workpiece which due to their low power can be located directly at the spark gap. However, the current amplitude of these generators is 2 to 3 A at the most and the resulting erosion performance is too low for the application in the medium-machining range.

Figure 3:
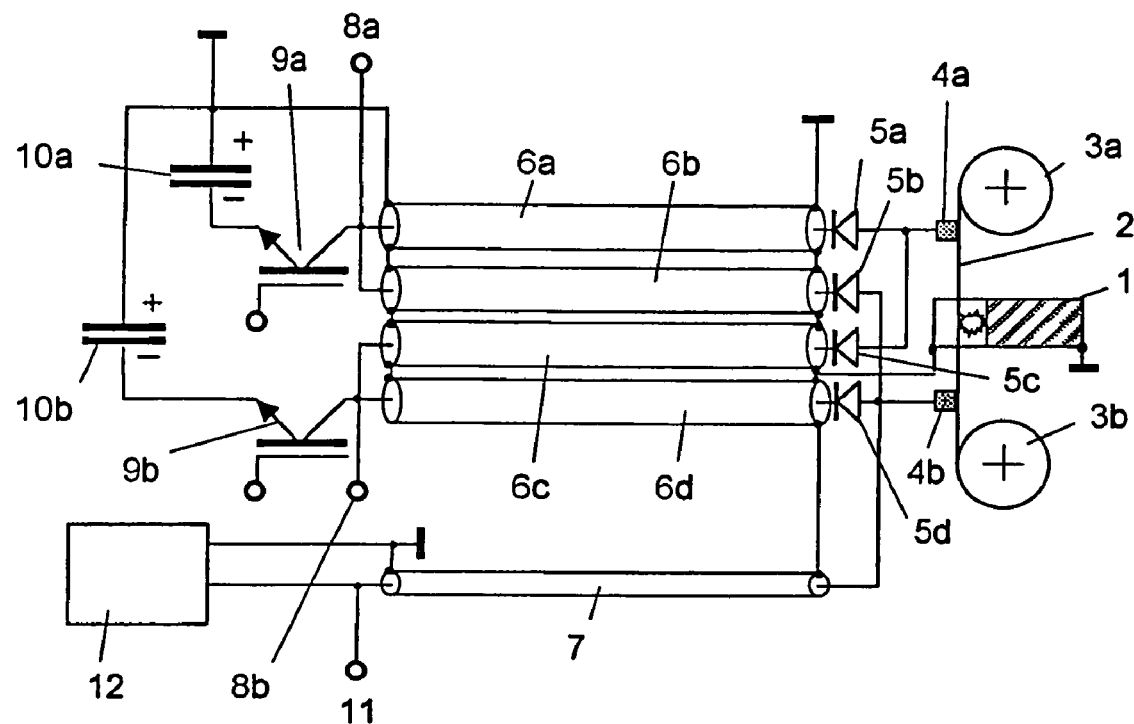
FIG. 3 is a block diagram of a electrical discharge machine suitable for a generator in accordance with an embodiment of the invention.

Referring now to FIG. 3, there is shown the part of a wire-cutting EDM machine fitted with terminals 8a, 8b and 11 as needed for a pulse generation apparatus in accordance with an embodiment of the invention. FIG. 3 is divided schematically into three portions: 1-5d is the machining portion, 6a-7 the cabling portion and 8a-12 is the generator portion. As is evident, this embodiment of the invention requires modifications only in the generator portion. This is surprising since the person skilled in the art would immediately concentrate on the machining portion in improving the pulse shape there, as is e.g. documented by JP 07-266 133A.

A workpiece 1 normally grounded by the structure of the machine executes by known ways and means the axis movements relative to a wire electrode 2. This is why the workpiece 1 is connected via a plurality of low-inductive, but flexible striplines to all outer screens of the coaxial cables or lines 6a-6d of the cabling portion. Normally, the outer screens are likewise grounded at this point by the structure of the machine. The wire electrode 2 is unreeled as usual from an upper guide roller 3a and guided through the working portion at a defined speed and tension and then re-reeled on a lower guide roller 3b or reduced in size by a wire chopper. Disposed directly above and below the workpiece 1 are guiding heads (not shown) with all known functions. Belonging thereto are the current feed contacts 4a and 4b as well as, in their immediate vicinity, fast power diodes 5a to 5d which in turn are connected to the inner conductors of the coaxial cables 6a-6d.

In FIG. 3, the pairs of coaxial cables 6a, 6b and 6c, 6d, respectively, are provided which are dimensioned for machining pulses in implementing rough-machining of the workpiece, e.g. with a roughness in the range of about Ra 1.5 µm, the frequency of the rough-machining pulses being e.g. approximately 70 kHz. The coaxial cable pairs 6a, 6b and 6c, 6d are connected to a discharge transistor 9a and 9b, respectively, in the generator portion, two coaxial cables at the machine end each being divided to the upper current contact 4a and lower current contact 4b. In this embodiment, this is important for maximizing erosion in rough-machining to load the wire electrode 2 with the same current on both sides in every generator setting. This arrangement is likewise of advantage for an extension in accordance with the invention, resulting in the discharge being fed from both sides via the wire electrode 2 into the spark gap, reducing its unwanted stray inductance practically by half in thus achieving a steeper increase in current.

Shown in the embodiment are four coaxial cables 6a-6d, eight or more thereof may be preferably provided in reality since also more than two discharge transistors 9a, 9b are used. The total pulse current of such an arrangement amounts to more than 1000 A for a typical pulse-on time of approximately 2 μs. To transmit such pulses, in this embodiment preference is given to coaxial cables having a large cross-section and a wave impedance of e.g. 10Ω or less, corresponding to a capacitance density of 600 pF/m and an inductance density of 60 nH/m.

In FIG. 3, provided as a further line is a coaxial cable 7 for fine-machining (hereinafter referred to as "fine-machining cable") which is fed by a HF generator 12 (hereinafter referred to as "fine-machining generator"). The fine-machining cable 7 is dimensioned so that it is suitable for transmitting machining pulses for implementing fine-machining of the workpiece, e.g. with a surface roughness in the range below about Ra=0.15 μm. In this embodiment the fine-machining cable 7 serves to transmit bipolar or monopolar pulses generated by the fine-machining generator 12, this being the reason why this fine-machining cable 7 is connected without a diode directly to the working gap and comprises preferably a typical wave impedance of 50Ω corresponding to a capacitance density of 100 pF/m and an inductance density of 260 nH/m. The coaxial cables 6a-6d and 7 which may also be configured as striplines or as twisted pairs with similar properties are typically 2 to 5 m long on current EDM machines.

In this embodiment use is made of the already existing rough-machining cables 6a-6d and/or the fine-machining cable 7 of the EDM machine, although it is also possible that additional cables or lines are provided for the method in accordance with the invention. As detained in the following, these lines are used for machining workpieces in the medium-machining range.

In the embodiment of FIG. 3, the diodes 5a-5d arranged between the contacts 4a, 4b and the end of each coaxial cable 6a, 6b, 6c, 6d have two functions: firstly, in isolating the capacitance from the working gap during a fine-machining step, as it reads from the European patent EP 0 313 049 B1, the content thereof being incorporated herein by reference and to be considered as part of the disclosure, whilst, secondly, being an important component of the pulse generation apparatus for rough-machining (e.g. as it reads from the European patent EP 0 268 109 B1, the contents thereof being incorporated herein by reference and to be considered as part of the disclosure). When power capacitors 10a and 10b, as shown in FIG. 3, are discharged via discharge transistors 9a and 9b on the working gap for rough-machining, without the provision of the diodes 5a-5d, reflections and an oscillating bipolar discharge would result with corresponding wear of the wire electrode. The diodes 5a-5b prevent the current pulses from over shooting and inhibit reflections and thus turning the discharge transistors 9a, 9b off during zero voltage and zero current conditions, in other words without switching losses.

In accordance with the embodiment of the invention, the diodes 5a-5d have a third function, i.e., preventing an undershoot in the medium-machining range (e.g. Ra=0.8-0.15 μm) when a non-adapted coaxial cable or line is discharged in the working gap. Using high speed diodes 5a-5d eliminates the need of an impedance matching necessary in the prior art line generators, as discussed in the introductory part, to obtain the desired pulse shaping. The diodes 5a-5d, in this embodiment, eliminate or stop reflected waves propagating on the coaxial lines.

Figure 4:
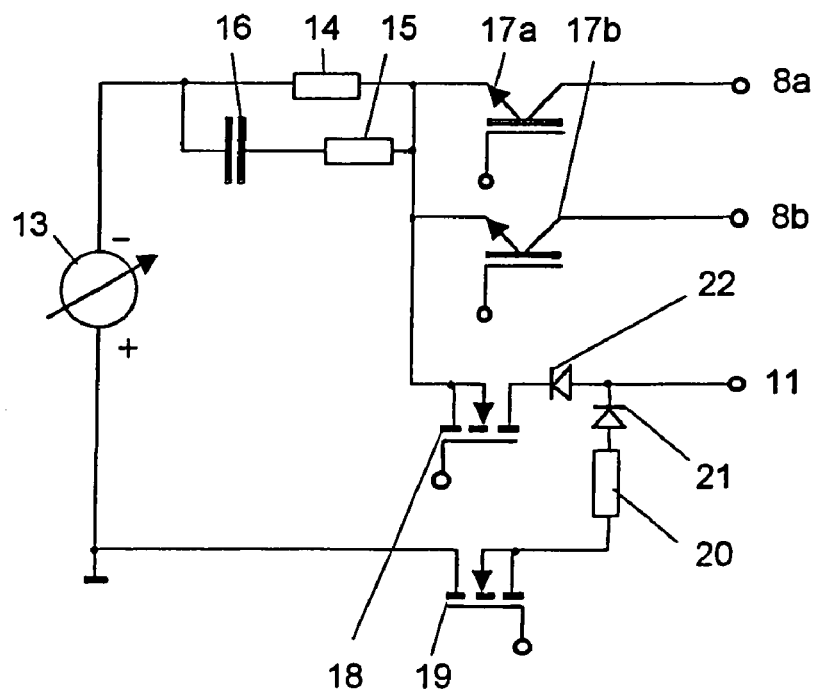
FIG. 4 is a block diagram of an embodiment in accordance with the invention for line charging and discharging.

Referring now to FIG. 4, there is illustrated an example of a generator extension in accordance with this embodiment for rendering the medium-machining range more efficient. A variable voltage source 13 is arranged to supply a charging voltage to the existing coaxial cables 6a-6d of the EDM machine, as shown in FIG. 4, and thus simultaneously the no-load voltage Ugap at the working gap. This voltage source 13 is programmed by a control means (not shown) to a voltage of typically 60V to approximately 350V depending on the desired no-load voltage Ugap. Via the charge switching elements 17a and 17b one or more coaxial cable pairs 6a, 6b and 6c, 6d may be charged in accordance with the desired current pulse value. An RC member 15, 16 comprising a resistor 15 and a capacitance 16 generates thereby a first steep increase in voltage whilst the resistor 14 permits an asymptotic convergence of voltage on the spark gap to the desired no-load voltage Ugap, as shown in FIG. 1. At the time $t_0$ in FIG. 1 the charge switching elements 17a, 17b are turned on by the control means (not shown) for charging the coaxial cable pairs 6a, 6b and 6c, 6d, respectively, through the capacitance 16 and the resistor 15 or resistor 14 from the variable voltage supply source 13. The voltage Ugap on the spark gap rises from $t_0$ to $t_1$ ($t_1$ denotes the discharge start time) in FIG. 1. After ignition of the spark gap occurs, a steep increase of the gap current Igap is obtained, e.g., having an initial rise time of about 1 A/ns, between $t_0$ and $t_k$ ($t_k$ denotes the pulse current rise time). For example, in about 100 ns the discharge current Igap of about 6-100 A is provided. When the discharge switching elements 17a, 17b are turned off by the control means (not shown), the charging of the working gap can be stopped.

When sparking in the working gap between the wire electrode 2 and workpiece 1 occurs, the coaxial cables 6a-6d are discharged via the corresponding power diodes 5a-5d in accordance with the principle of a line generator, i.e., the discharged energy is stored substantially capacitively in the transmission lines, and making use of the characteristical properties of the lines for pulse shaping. In the ideal case of a line generator, in other words, the lines functioning without loss homogenously in storing energy, the output pulse is square with a precisely defined pulse duration. Pulse shapes are defined generally by the line equations containing the parameters of the transmission lines. The pulse duration is determined, for example, by the length of the lines, in this embodiment the coaxial cables 6a-6d, and its amplitude by the charging voltage of the voltage source and the line impedance. Including the power cables already existing on a EDM machine, such as the rough-machining coaxial cables 6a-6d, in accordance with an embodiment, in pulse generation based on the principle of line discharge now makes it possible to furnish short and high machining pulses for EDM and thus extremely high plasma temperatures in a very efficient way. The power cables are charged and discharged at the generator end by the aforementioned charging circuit with a special characteristic. On ignition of the spark gap at the working gap the pulse current is able to increase significantly quicker to its maximum value than possible with known generators. In accordance with a preferred embodiment, the pulse generation apparatus is suitable for all electrical discharge machining applications requiring minimum surface damage and high erosion performance. Particularly good results are obtained e.g. in electrical discharge machining of the materials polycrystalline diamond (PCD), cubic boron nitride (CBN), hard-metal, carbide as well as high melting metals.

In case of non-ignition of the spark gap the coaxial cables 6a-6d as well as a parasitic capacitance of the working space are discharged by a discharge switching element 19 after a certain pulse-on time.

In the embodiments of FIGS. 3 and 4, with the coaxial cables 6a-6d and the cited typical values would theoretically result in a square pulse of 50 A for a pulse duration of 42 ns on the basis of the theory of line generators for a charging voltage of 300V. Since the wire electrode 2 and the connection to the workpiece 1 comprise a parasitic inductance of approximately 330 nH and a parasitic capacitance of approximately 2.7 nF, the actual current pulse is somewhat flattened and typically amounts to 36 A for a duration of 150 ns which, however, satisfies requirements. Due to the described pumping effect of the line discharge and the fact that the parasitic inductances and parasitic capacitances are locally distributed, the increase in current is nevertheless steeper than as expected purely mathematically. Even shorter pulses and an even steeper increase in current are achievable simply by considerably reducing the parasitic inductance. Suitable for doing this are, for example, coaxial wiper or sliding contacts on the workpiece 1, as already in the German patent DE 26 53 857 C2 the content thereof being incorporated herein by reference and to be considered as part of the disclosure.

A further example with two cable pairs 6a, 6b, 6c, 6d and a charging voltage of 280V results in, theoretically 92 A for a pulse duration of 42 ns, but actually in excess of 43 A for a duration of 190 ns. Further increasing the number of cable pairs results correspondingly in higher and somewhat wider pulses which, however, can be fully appropriate for faster, albeit somewhat coarser machining.

In yet a further embodiment, for even higher energy pulses it may be of interest to artificially increase the pulse current by introducing switchable pulse capacitors in the vicinity of the current contacts 4a, 4b. These additional capacitors too are then discharged by the discharge switching element 19 should the spark gap fail to ignite, and maintained at 0V charging voltage during the pulse-off time.

For even finer machining there is provided, as shown in FIG. 4, a charge switching element 18 connected via a charging diode 22 and the terminal 11 to the fine-machining cable 7, the charging diode 22 being provided so as not to disturb the bipolar mode of operation of the fine-machining generator 12. Theoretically the fine-machining cable 7 ought to supply for a charging voltage of 135V a current pulse of 2.2 A with a duration of 36 ns; actually, measurements surprisingly produced 12 A and 100 ns. This shows that the stray capacitance of 2.7 nF contributes considerable more to energy storage than the fine-machining cable 7. However, this is of secondary importance for the improved result of machining.

In the embodiment as shown in FIG. 4, there is further provided the aforementioned discharge switching element 19 which, as described, is able to discharge the various capacitances effectively at the working gap via a discharge resistor 20 and a discharge diode 21 without undershoot. It is for this reason that the discharge diode 21 is provided the same as the charging diode 22, i.e., to avoid obstructing bipolar operation of the fine-machining generator 12. Making these connections of a switching element in series with a diode permits to inhibit current flow in both directions in the OFF condition.

Although MOSFETs (metal oxide semiconductor field effect transistors) and IGBTs (insulated-gate bipolar transistors) are identified by way of example in FIG. 4 as switching elements this is not a mandatory selection, it being left to the person skilled in the art to make the choice, since developments of these components are accelerating and nowadays there being hardly any differences in the switching speed of the two technologies so that IGBT is being given increasing preference, of course.

The diagrams of FIG. 5 to FIG. 8 illustrate the advancements provided by embodiments of the invention, as compared to known prior art techniques, should a generator be required to be operated in the aforementioned pulse range of 6 A to 100 A. Here only the discharge cycle is taken into account and not including charging losses and further assuming an effective spark voltage of 25V.

Figure 5:
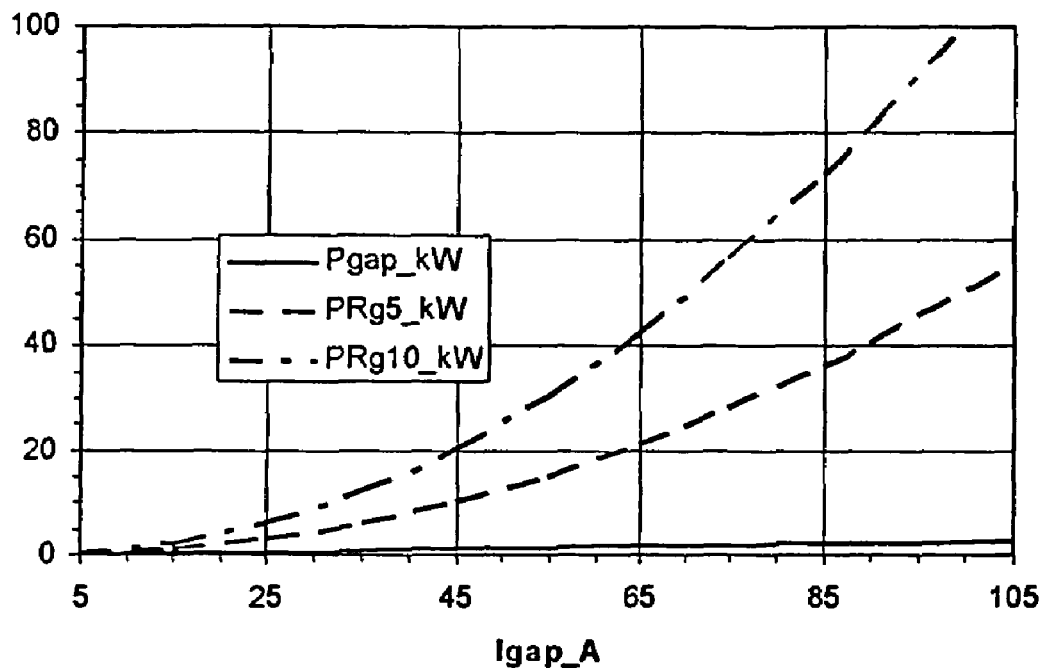
FIG. 5 is a graph plotting pulse power as a function of the pulse current of the prior art generator of FIG. 2.

Referring now to FIG. 5, there is illustrated the pulse power effective on the working gap, Pgap.kW, of the Oizumi generator (solid curve) which increases linearly with the pulse current Igap.A to the value of about 2.5 kW at 100 A. The dotted curve shows the pulse power loss PRg5.KW of the terminal resistors ZA, ZB in the Oizumi generator in the case of a line impedance of 5Ω increasing as the square of the pulse current. The dash-dotted curve shows the pulse power loss PRg10.kW of the terminal resistors ZA, ZB in the case of a line impedance of 10Ω amounting to an enormous value of 100 kW at a pulse current of about 100 A.

Figure 6:
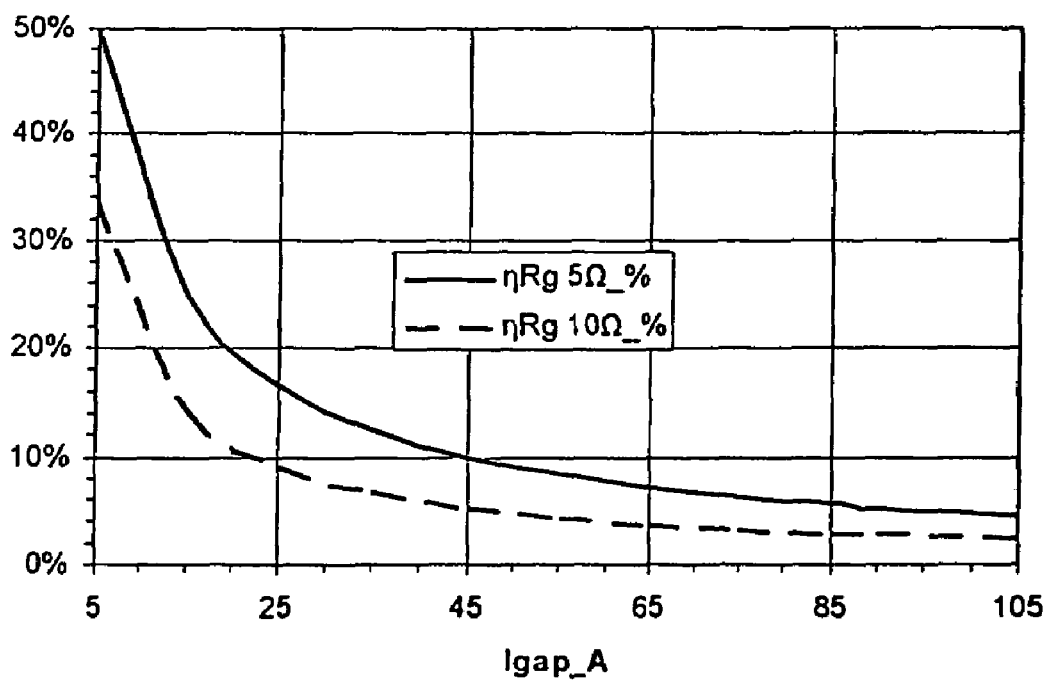
FIG. 6 is a graph plotting efficiency as a function of the pulse current of the prior art generator of FIG. 2.

Referring now to FIG. 6, there is illustrated the resulting efficiency of discharge in the Oizumi generator, the higher the pulse current the lower the efficiency. The solid curve ηRg 5Ω% shows the profile for a cable impedance of 5Ω, the dashed curve ηRg10W.% that for a cable impedance of 10Ω.

Figure 7:
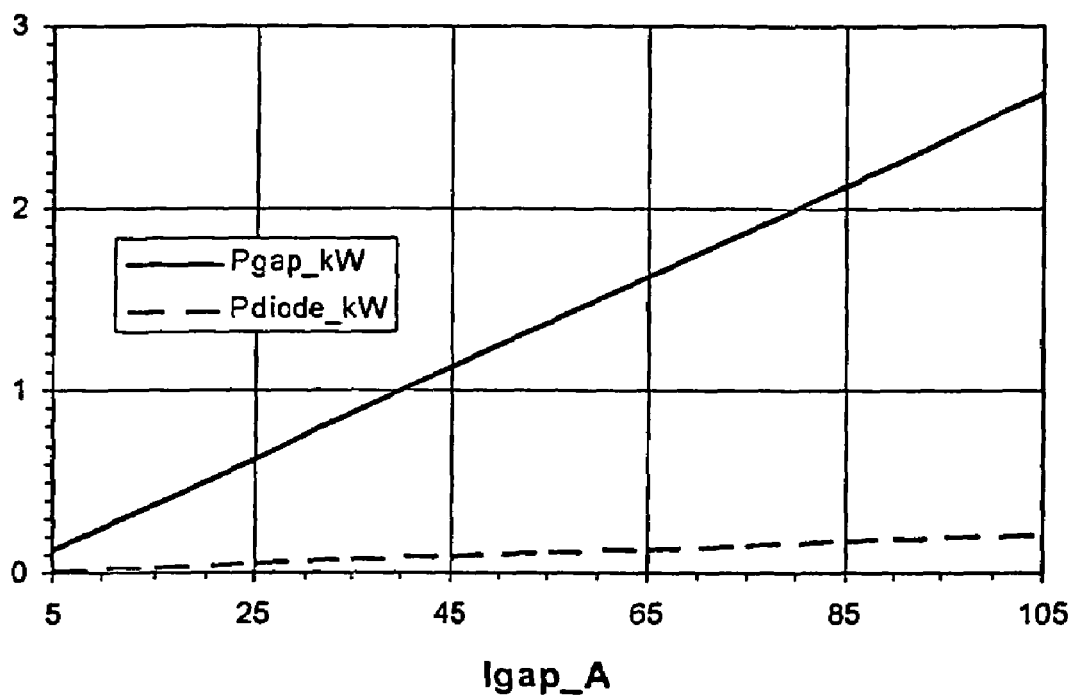
FIG. 7 is a graph plotting pulse power as a function of the pulse current of a generator in accordance with an embodiment of the invention.

Referring now to FIG. 7, there are illustrated the same curves (however, in a different scale) obtained by a generator in accordance with an embodiment of the invention in assuming a voltage drop of 2V across the diodes 5a-5d in FIG. 3, resulting in a pulse power loss, Pdiode.KW, across the diodes of 0.2 kW for pulse current of 100 A, in other words a power loss 500 times smaller than with the Oixumi generator.

Figure 8:
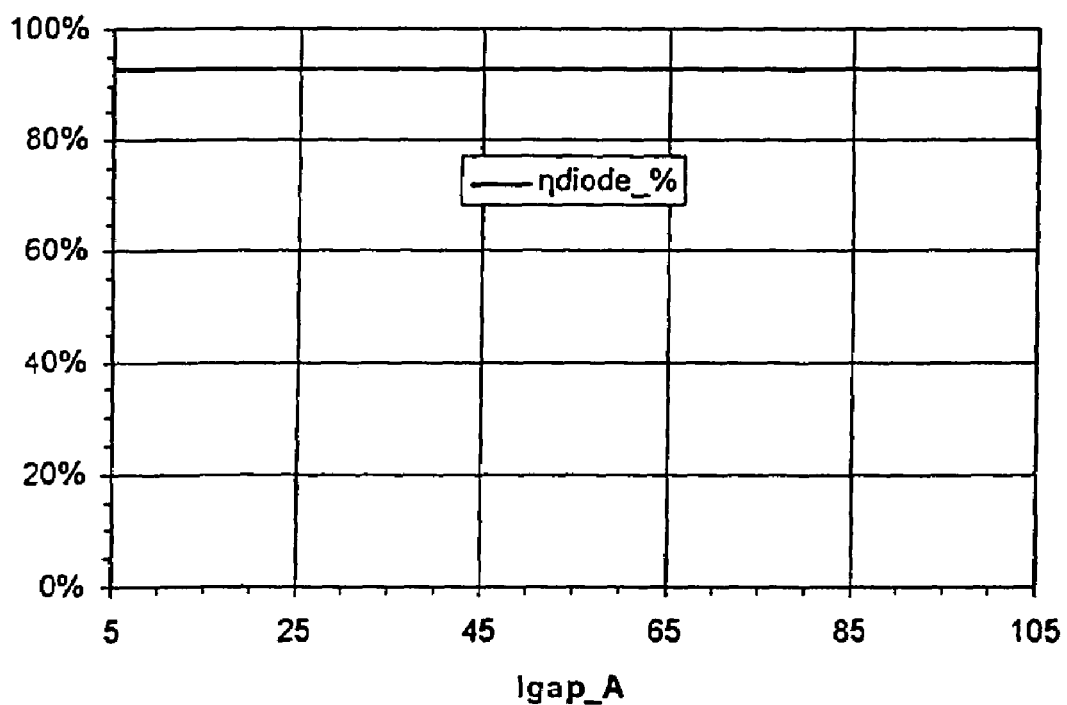
FIG. 8 is a graph plotting efficiency as a function of the pulse current of a generator in accordance with an embodiment of the invention.

Referring now to FIG. 8, there is illustrated a resulting pulse efficiency, ηdiode.%, of the discharge in accordance with this embodiment of the invention. Since both the pulse power, Pgap.kW, applied to the working gap and the pulse power loss, Pdiode.kW, of the diodes increases only linearly with the pulse current, a discharge efficiency ηdiode.% of about 92.6% materializes over the full range of application.

It is to be understood that the invention is not limited in its application to the details of construction and the arrangement of the components set forth in the above description of embodiments or illustrated in the drawings. The invention is capable of including other embodiments or being carried out for similar generators having the same function. Also, it is to be understood that the phraseology and terminology employed herein are for the purpose of description and should not be regarded as limiting.

All publications and existing systems mentioned in this specification are herein incorporated by reference.

Although certain devices and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A method of generating machining pulses for electrical discharge machining by discharging at least one line to apply a voltage to a working gap formed between a machining electrode and a workpiece, comprising the steps of:
charging the line to store energy substantially capacitively via a first charging circuit by a voltage source,
igniting a spark gap;
discharging the line after ignition of the spark gap via a diode connected between the line and the working gap, without using impedance matching circuitry, at the working gap, and
substantially capacitively recharging the line after a predefined pulse-off time.

2. The method of claim 1, wherein the line comprises at least one coaxial line of an electrical discharge machine, said line being designed for a rough-machining stage.

3. The method of claim 2, wherein the coaxial line comprises a line capacitance of approximately 600 pF/m and a line inductance of approximately 60 nH/m.

4. The method of claim 1, comprising the steps of:
charging a coaxial line designed for a fine-machining stage of an electrical discharge machine via a second charging circuit in series with a charging diode by the voltage source, and discharging the coaxial line after igniting the spark gap, without using impedance matching circuitry, at the working gap and recharging the coaxial line after a predefined pulse-off time.

5. The method of claim 4, wherein the coaxial line comprises a line capacitance of approximately 100 pF/m and a line inductance of approximately 260 nH/m.

6. The method of claim 4, wherein at least one of the first charging circuit and the second charging circuit is dimensioned so that the charging voltage is subject to a first steep increase and an asymptotic convergence on the spark gap.

7. The method of claim 1, wherein on failure of ignition of the spark gap the line is discharged after a predefined pulse-on time and recharged after the pulse-off time by the respective charging circuit.

8. The method of claim 7, wherein a discharge circuit is provided and dimensioned so that discharge of the line and/or of a parasitic capacitance of the working space occurs without undershoot.

9. The method of claim 1, further comprising generating machining pulses having an initial rise time of at least 1 A/ns.

10. The method of claim 1, further comprising generating machining pulses having an amplitude in the range of 6 A-100 A and a pulse duration of at least about 250 ns, and wherein the maximum amplitude occurs not later than about 100 ns after ignition of the spark gap.

11. The method of claim 1, wherein the line is approximately 2 m to 5 m long.

12. The method of claim 1, comprising using a variable voltage.

13. The method of claim 1, for wire EDM machining, comprising, for dispensing the pulse energy, charging at least one line to a predefined voltage and applying the same number of charged lines to the machining electrode in the region above and below the workpiece.

14. The method of claim 1, comprising in order to further increase the pulse energy increasing the pulse current in the working space by additionally switching one or more pulse capacitors into the circuit.

15. The method of claim 1, comprising in order to reduce the parasitic inductance bringing coaxial sliding contacts into contact with the workpiece surface.

16. The method of claim 1, comprising machining the workpiece in a medium-machining range between rough-machining and fine-machining.

17. The method of claim 16, wherein the medium-machining range comprises a surface roughness (Ra) in the range of 0.15 μm to 0.8 μm.

18. An apparatus for generating machining pulses for electrical discharge machining by discharge of at least one line to apply a voltage to a working gap formed between a machining electrode and a workpiece and discharging energy stored substantially capacitively in said line for generating machining pulses for electrical discharge machining, comprising a first charging circuit connected to a voltage source for charging the line from a generator end, and discharging the line after ignition of the spark gap via a diode connected between the line and the working gap, without using impedance matching circuitry, at the working gap, and for recharging the line after a predefined pulse-off time, wherein the line is configured to store energy substantially capacitatively.

19. The apparatus of claim 18, wherein as the line comprises at least one coaxial line of an electrical discharge machine designed for a rough-machining stage.

20. The apparatus of claim 19, wherein the positive terminal of the voltage source is connected to at least one of an outer conductor of the rough-machining coaxial cable and an outer conductor of the fine-machining coaxial cable and the line switching element is connected to at least one of an inner conductor of the rough-machining coaxial cable and an inner conductor of the fine-machining coaxial cable.

21. The apparatus of claim 18, further comprising a coaxial line which is designed for a fine-machining stage of the electrical discharge machine, a second charging circuit in series with a charging diode for charging the coaxial line by the voltage source, and the coaxial line being discharged after ignition of the spark gap, without using impedance matching circuitry, at the working gap.

22. The apparatus of claim 21, wherein at least one of the first charging circuit and the second charging circuit comprise in series: the voltage source connected by a terminal to the outer conductor of the coaxial line, an RC member with a resistor in parallel therewith, and at least one charge switching element connected at a generator end with an inner conductor of the, coaxial line.

23. The apparatus of claim 18, comprising a discharge circuit dimensioned so that discharge of the line and/or of a parasitic capacitance of the working space occurs without undershoot.

24. The apparatus of claim 23, wherein the discharge circuit comprises a discharge switching element connected in series with a discharge resistor and a discharge diode at a generator end between an outer conductor of the, or of every, coaxial line and an inner conductor of the coaxial line.

25. The method of claim 24, comprising generating machining pulses having an initial rise time of at least about 1 A/ns.

26. The apparatus of claim 18, wherein the voltage source is a variable voltage source.

27. A method for generating machining pulses for electrical discharge machining an apparatus by discharging of at least one line, applying a voltage to a working gap formed between a machining electrode and a workpiece, wherein the apparatus comprises a first charging circuit connected to a voltage source for charging the line from a generator end, and discharging the line after ignition of the spark gap via a diode connected between the line and the working gap, without using impedance matching circuitry, at the working gap, and for recharging the line after a predetermined pulse-off time, wherein the line is configured to store energy substantially capacitatively, the method, comprising generating machining pulses having a leading edge reaching a amplitude of about 6 A to 100 A no later than about 100 ns after ignition of a spark gap.

28. The method of claim 27, comprising generating machining pulses having a maximum pulse duration of about 250 ns.

29. The method of claim 27, comprising generating machining pulses with a an effective spark voltage of about 25 V, said pulses providing a pulse power of about 100 W to 2 kW during about 100 ns after ignition.

30. The method of claim 27, comprising generating machining pulses with a an effective spark voltage of about 25 V, said pulses providing a pulse energy of about 10 µJ to 200 µJ during about 100 ns after ignition.

31. The method of claim 27, comprising EDM machining of polycrystalline diamond (PCD), cubic boron nitride (CBN), hard metal, carbide or high-melting materials.

* * * * *